US012571161B2

(12) United States Patent
Silveri et al.

(10) Patent No.: US 12,571,161 B2
(45) Date of Patent: Mar. 10, 2026

(54) DEFLAKING ELEMENT FOR PULPER

(71) Applicant: Kadant Black Clawson LLC, Lebanon, OH (US)

(72) Inventors: Luigi Silveri, Hudson, NH (US); Aaron Karneth, Bedford, NH (US)

(73) Assignee: Kadant Black Clawson LLC, Lebanon, OH (US)

( * ) Notice: Subject to any disclaimer, the term of this patent is extended or adjusted under 35 U.S.C. 154(b) by 287 days.

(21) Appl. No.: 18/201,587

(22) Filed: May 24, 2023

(65) Prior Publication Data

US 2024/0392501 A1 Nov. 28, 2024

(51) Int. Cl.

| | |
|---|---|
| ***D21D 1/00*** | (2006.01) |
| ***B02C 7/12*** | (2006.01) |
| ***D21B 1/34*** | (2006.01) |
| ***D21D 1/22*** | (2006.01) |
| ***D21D 1/30*** | (2006.01) |

(52) U.S. Cl.

CPC ............... *D21D 1/004* (2013.01); *B02C 7/12* (2013.01); *D21B 1/345* (2013.01); *D21D 1/008* (2013.01); *D21D 1/22* (2013.01); *D21D 1/306* (2013.01)

(58) Field of Classification Search

CPC .......... D21B 1/34; D21B 1/345; D21B 1/347; D21D 1/004; D21D 1/006; D21D 1/008; D21D 1/22; D21D 1/30; D21D 1/306; B02C 7/12

See application file for complete search history.

(56) References Cited

U.S. PATENT DOCUMENTS

| | | | | |
|---|---|---|---|---|
| 2,694,344 A * | 11/1954 | White | ...................... | D21D 1/22 241/261.1 |
| 3,428,261 A | 2/1969 | Moulton | | |
| 4,011,027 A | 3/1977 | Selder | | |
| 4,171,101 A | 10/1979 | Seifert et al. | | |
| 4,365,761 A | 12/1982 | Danforth | | |
| 4,482,095 A | 11/1984 | Danforth | | |
| 5,918,822 A | 7/1999 | Sternby | | |
| 6,053,441 A | 4/2000 | Danforth et al. | | |

(Continued)

OTHER PUBLICATIONS

International Searching Authorit , "International Search Report and Written Opinion", App. No. PCT/US2024/030962, Aug. 14, 2024, 12 pages.

*Primary Examiner* — Jared O Brown

(74) *Attorney, Agent, or Firm* — Dinsmore & Shohl LLP

(57) ABSTRACT

A defibering and deflaking pulper has a defibering rotor-stator pair and a deflaking rotor-stator pair for processing a fiber-based material into smaller pieces. The defibering and deflaking pulper creates an impeller-produced vortical circulation that pulls the material through a defibering rotor-stator interface, where the material is broken down into smaller pieces, and then through a deflaking rotor-stator interface, where the smaller pieces are broken down into even smaller pieces. The defibering and deflaking pulper accumulates the defibered and deflaked material that passes through the defibering rotor-stator interface and the deflaking rotor-stator interface for further processing. This combination of defibering and deflaking in the defibering and deflaking pulper reduces plugging from larger pieces of the material and reduces downstream processing of the material, thus increasing productivity and reducing costs.

20 Claims, 4 Drawing Sheets

(56) References Cited

U.S. PATENT DOCUMENTS

| | | | | |
|---|---|---|---|---|
| 2013/0174517 | A1 | 7/2013 | Kelley et al. | |
| 2019/0316295 | A1* | 10/2019 | Anderson | D21D 1/306 |
| 2021/0138480 | A1 | 5/2021 | Kelley | |

* cited by examiner

DEFLAKING ELEMENT FOR PULPER

REFERENCE TO RELATED APPLICATIONS

No related applications

FEDERALLY SPONSORED RESEARCH OR DEVELOPMENT

No federally-sponsored research or development.

BACKGROUND

Pulping is the process of breaking down fiber-based raw materials into pieces, then flakes, and ultimately into individual fibers. A pulper usually is used in the initial breakdown or defibering of the material to reduce the material into pieces in a slurry. The pulper typically breaks down the fiber-based material without the use of steam or chemicals to the point where it can be pumped to a downstream process for a second breakdown or deflaking of the material into smaller pieces. The smaller pieces may be used or further processed to make new products such as paper, carpet, or the like.

In a typical pulper, the fiber-based material usually is mixed with water in a tank containing a rotor that provides circulation. The material is broken down primarily in the relatively small zone immediately adjacent to the spinning rotor where there is sufficient turbulence and shear forces. A Tornado pulper, by contrast, has a rotor-stator pair that is configured to acquire and cut the material. In operation, the rotor creates an impeller-produced vortical circulation that pulls the material and water through the rotor-stator interface, where the material is broken down into smaller pieces of a suitable size and consistency. The stator inner edge and the rotor outer edge form cutting surfaces that form a scissor-like action when the material passes through the rotor-stator interface, which may be conical or cylindrical.

The material may be wood pulp, cotton, hemp, flax, straw, rag, leather, non-wood fibers, impregnated fibrous materials, carpet, textiles, wet strength papers or boards, synthetic fibers, fibrous material bound by adhesives, or the like. Other materials may be used that the pulper and subsequent processing reduces into smaller pieces for making different products. These different materials each have particular processing requirements that the pulper must accommodate. Various pulpers have been developed in attempts to address the processing of various materials.

U.S. Pat. No. 3,428,261 discloses a method and apparatus for pulping and defibering in which there is a circulation impeller cooperable with an attrition interface to defiber, or disintegrate, the material being circulated.

U.S. Pat. No. 4,365,761 discloses an apparatus and method for defibering unconventional material in which difficult to defiber stock of the hemp, flax, rag, leather, synthetic fiber, wet strength paper, sheet stock comprised of fibrous elements bound together by various adhesives, or other types of stock are enabled to be processed in a vortical circulation pulper with a predetermined blade clearance of about $^{15}/_{1000}$ of an inch so that the wear and tear of zero clearance is avoided.

U.S. Pat. No. 5,918,822 discloses a channeled pulp rotor for use in a generally cylindrical or tub shaped pulper apparatus to make a slurry out of a mixture of solid and liquid materials for such things as paper making. The channeled pulp rotor includes a rotor hub having at least one vane extending radially from a central axis of rotation of the rotor hub.

U.S. Pat. No. 6,053,441 discloses a toroidal flow pulper for difficult materials which includes a stock-holding tank with a rotor-stator pair mounted in the tank, typically a side-wall of the tank. A motor and drive shaft rotate the rotor within the stator.

United States Patent Application Publication No. 2013/0174517 discloses a carpet recycling method using a toroidal flow pulper, in which carpet is disintegrated in a quantity of liquid to form a slurry of fibrous carpet materials and carpet ash.

United States Patent Application Publication No. 2021/0138480 discloses a carpet recycling process and method using a toroidal flow pulper, in which pieces of carpet are disintegrated in a quantity of liquid to form a slurry of fibrous carpet materials and carpet ash.

The initial breakdown or defibering of the material may make large pieces that can plug the pulper. When these events occur, the pulper must be stopped for removal or release of the plug material. Additionally, the material output of the pulper usually is a slurry of the material in water. This slurry must be stored or handled appropriately for subsequent processing or deflaking of the material into smaller pieces. These processing concerns often result in less processing of material in the pulper than desired, which increases the operating costs of the pulping process.

As can be seen from the above description, there is an ongoing need for simple and efficient improvements to the pulping process of fiber-based materials that increases production and reduce costs. The present invention avoids, overcomes, or ameliorates at least one of the disadvantages associated with conventional pulpers.

SUMMARY

A defibering and deflaking pulper has a defibering rotor-stator pair and a deflaking rotor-stator pair for processing a fiber-based material into smaller pieces. The defibering rotor and the deflaking rotor are rotated to create an impeller-produced vortical circulation that pulls the material through a defibering rotor-stator interface, where the material is broken down into smaller pieces (defibering or pulping), and then through a deflaking rotor-stator interface, where the smaller pieces are broken down into even smaller pieces (deflaking). The defibering and deflaking pulper accumulates the defibered and deflaked material for further processing.

In one aspect, the present general inventive concept provides a defibering and deflaking pulper for processing a fiber-based material into smaller pieces. Various example embodiments of the defibering and deflaking pulper according to various aspects of the present general inventive concept may be achieved by providing a base with a pulper body that forms a chamber. In various embodiments, a shaft may be suspended by at least one bearing mounted on the base. A defibering rotor-stator pair and a deflaking rotor-stator pair may be axially mounted to the shaft. The deflaking rotor-stator pair may be disposed between the defibering rotor-stator pair and the chamber.

In another aspect, various features according to the present general inventive concept may be achieved by providing a defibering and deflaking pulper for processing a fiber-based material into smaller pieces. The defibering and deflaking pulper may have a base with a pulper body that forms a chamber. A shaft may be suspended by at least one bearing, which may be mounted on the base. A defibering stator may be attached to the pulper body, where the defibering stator may be a stationary element. A defibering rotor may be axially mounted on the shaft. The defibering rotor may, in various embodiments, be a rotating element mounted in close proximity to the defibering stator to form a defibering rotor-stator interface. A deflaking stator may be attached to the pulper body and aligned with of the defibering rotor-stator interface. The deflaking stator may, in various embodiments, be an annular stationary deflaking element. A deflaking rotor may be an annular rotating deflaking element attached to the defibering rotor. The deflaking rotor may be in close proximity to the deflaking stator to form a deflaking rotor-stator interface.

Other systems, methods, features and advantages of the present general inventive concept will be, or will become, apparent to one with skill in the art upon examination of the following figures and detailed description. It is intended that all such additional systems, methods, features, and advantages be included within this description, be within the scope of the present general inventive concept, and be protected by the claims that follow.

BRIEF DESCRIPTION OF THE FIGURES

Various aspects of the present general inventive concept can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
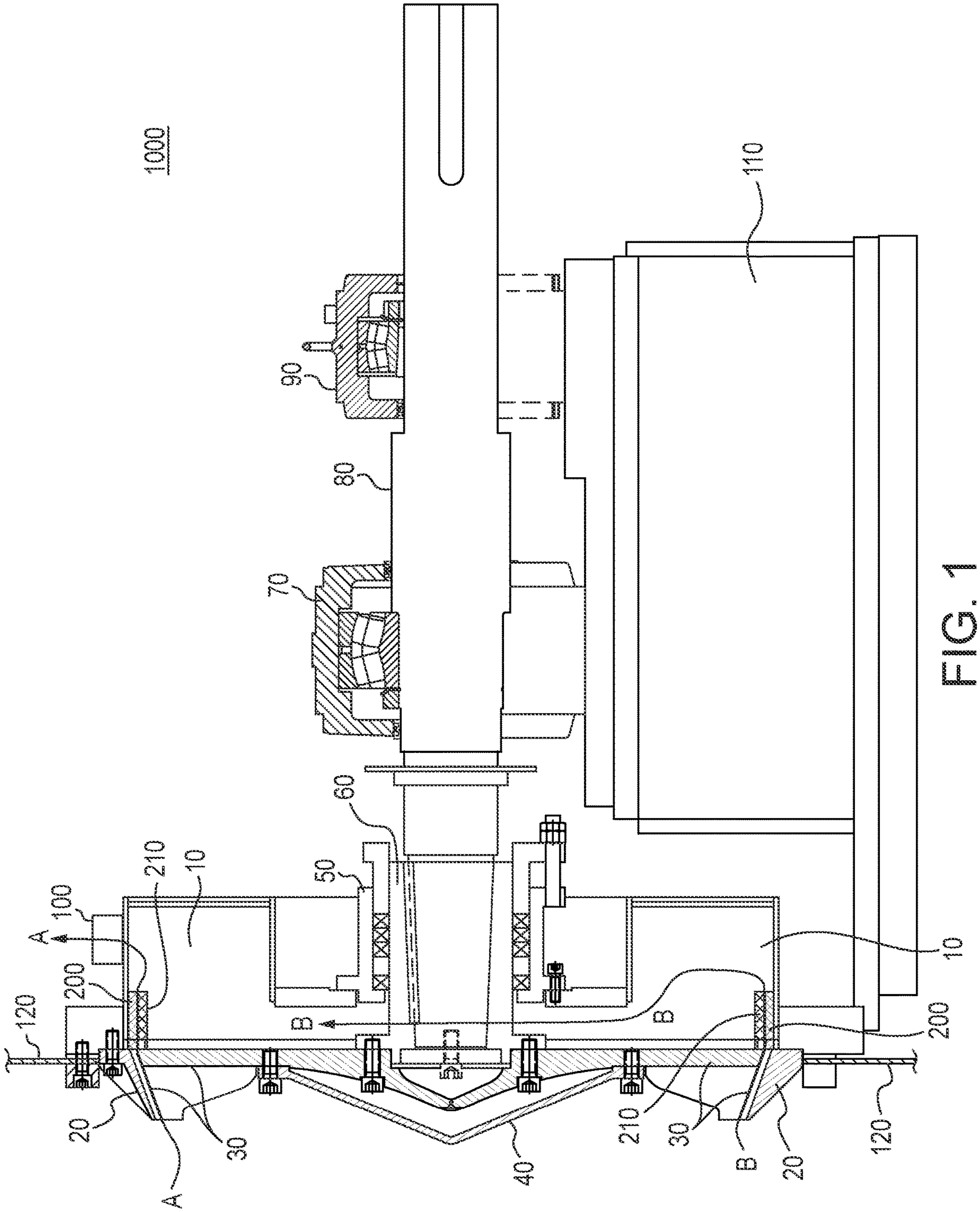
FIG. 1 depicts a side schematic view of one embodiment of a defibering and deflaking pulper.

In FIG. 1, a defibering and deflaking pulper 1000 has a defibering rotor-stator pair and a deflaking rotor-stator pair for processing a fiber-based material into smaller pieces. The defibering and deflaking pulper 1000 protrudes through a tank wall 120 of a vessel for holding the fiber-based material and water selected for processing. The defibering rotor-stator pair and the deflaking rotor-stator pair are axially mounted by a hub 60 with a sleeve to a shaft 80, which is suspended by bearings 70 and 90 mounted on a base 110. A motor engages the shaft 80 during operation, which rotates the defibering rotor-stator pair and the deflaking rotor-stator pair. The defibering rotor-stator pair faces the incoming fiber-bearing material disposed in the vessel. The deflaking rotor-stator pair is disposed between the defibering rotor-stator pair and the inner side of the wall of the pulper chamber. The base 110 connects to a pulper body that forms a chamber 10 on the opposite side of the defibering rotor-stator pair from the vessel In operation, the defibering and deflaking pulper 1000 creates an impeller-produced vortical circulation that pulls the material and water through a defibering rotor-stator interface, where the material is broken down into smaller pieces (defibering or pulping), and then through a deflaking rotor-stator interface, where the smaller pieces are broken down into even smaller pieces (deflaking). The defibering and deflaking pulper 1000 accumulates the defibered and deflaked material that passes through the defibering rotor-stator interface and the deflaking rotor-stator interface in chamber 10. The defibered and deflaked material exists the chamber 10 through an outlet 100 for further processing. This combination of defibering and deflaking in the defibering and deflaking pulper 1000 reduces plugging from larger pieces of the material and reduces downstream processing of the material, thus increasing productivity and reducing operating costs.

The defibering rotor-stator pair includes a defibering stator 20 and a defibering rotor 30. The defibering stator 20 has teeth or other cutting edges on its surface and is a stationary element attached to the pulper body. The pulper 1000 is bolted to a clamp ring that engages the tank wall 120. The defibering rotor 30 also has teeth or other cutting edges on its surface and is a rotating element mounted on the hub 60 with the sleeve. The hub 60 fits onto the shaft 80, which is turned by the motor. The shaft 80 is supported by bearings 70 and 90, which are mounted on the base 110. The defibering rotor 30 is disposed to spin in close proximity to the defibering stator 20 to form the defibering rotor-stator interface where the material is pulped or broken-down into smaller pieces. The defibering rotor 30 has a nose cone 40 axially positioned on the tank side to help direct the material and water into the defibering rotor-stator interface.

The deflaking rotor-stator pair includes a deflaking stator 200 and a deflaking rotor 210, and is positioned on the downstream side of the defibering rotor-stator pair and adjacent to the chamber 10 formed by the pulper body. The deflaking stator 200 is an annular stationary deflaking element attached to an inner wall of the pulper body aligned with and at the discharge of the defibering rotor-stator interface. The deflaking stator 200 has an internal diameter essentially the same as defibering stator 30 at that point. The deflaking rotor 210 is an annular rotating deflaking element attached to a chamber-side surface of the defibering rotor 30. The deflaking rotor 210 rotates at the same speed as the defibering rotor 30, and has an outside diameter essentially the same as the defibering rotor 30 at that point. The deflaking rotor 210 is disposed to spin in close proximity to the deflaking stator 200 to form a deflaking rotor-stator interface where the defibered material is deflaked or broken-down into smaller pieces than the fiber-based material that passed through the defibering rotor stator interface.

Figure 2B:
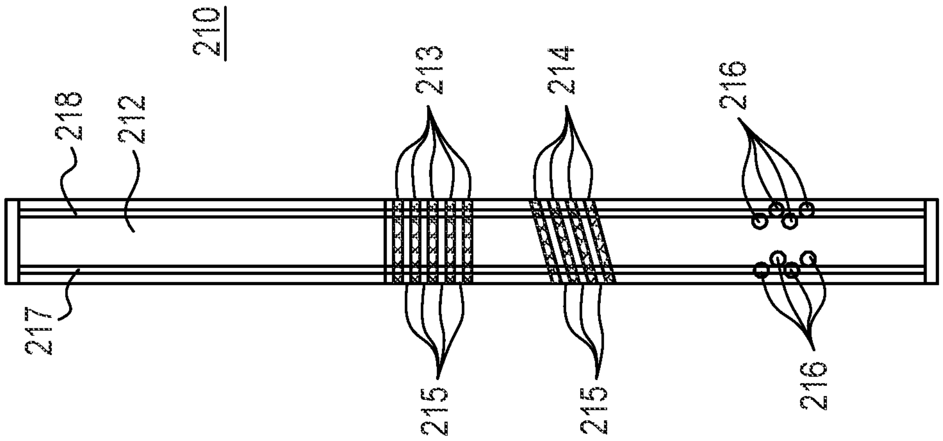
FIG. 2A and FIG. 2B depict axial and radial views, respectively, of various embodiments of a deflaking rotor which may be used in the embodiment of the defibering and deflaking pulper of FIG. 1.
Figure 2A:
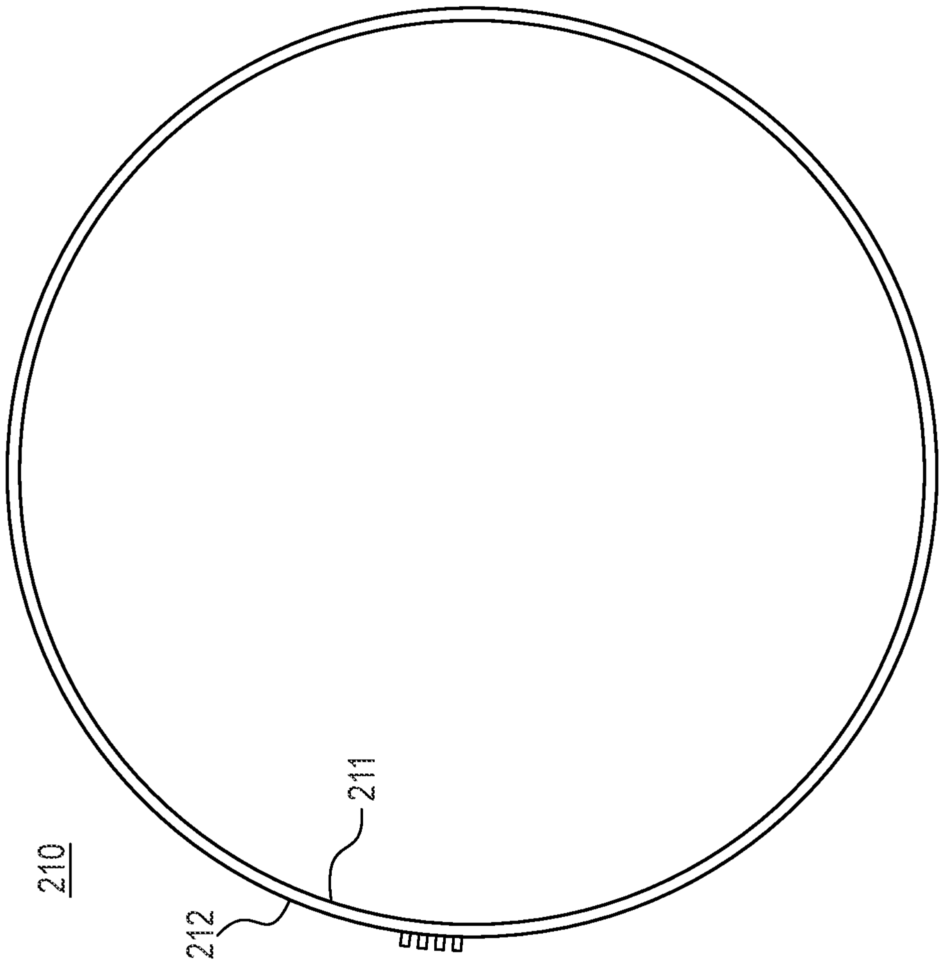

FIG. 2A and FIG. 2B depict axial and radial views, respectively, of the deflaking rotor 210 that has a deflaking rotor inner surface 211 and a deflaking rotor outer surface 212. The radial view in FIG. 2B depicts portions of various embodiments of the deflaking rotor outer surface 212 of the deflaking rotor 210. The deflaking rotor outer surface 212 faces the deflaking stator 200 at the deflaking rotor-stator interface. In various embodiments, the deflaking rotor outer surface 212 has multiple protrusions extending radially outward therefrom, circumferentially about the deflaking rotor outer surface 212, to deflake the material passing through the deflaking rotor-stator interface. As shown in FIG. 2B, in various embodiments, the multiple protrusions may include such shapes as rotor bars 213 and 214, rotor holes or openings 216, dimples, knobs, other shapes, a combination, or the like. It is generally understood that the multiple protrusion shapes, or combinations of shapes, are spaced generally about the entirety of the outer circumferential surface 212 of the deflaking rotor 210. However, it will be understood that this sort of "evenly spaced" configuration is not necessary to accomplish the deflaking rotor 210 in accordance with the present general inventive concept. For example, in other embodiments, only a portion of the deflaking rotor outer surface 212 may define the multiple protrusion shapes. In still other embodiments, the multiple protrusion shapes may be grouped together in clusters, with the clusters of multiple protrusion shapes being distributed in patterns, or even randomly, about the outer circumferential surface 212 of the deflaking rotor 210.

In one preferred embodiment, the deflaking rotor outer surface 212 has multiple parallel rotor bars 213 that are parallel to the main axis of the defibering and deflaking pulper 1000. In another preferred embodiment, the deflaking rotor outer surface 212 has multiple angled rotor bars 214 that are at an angle to the main axis of the defibering and deflaking pulper 1000. Preferably, the angled rotor bars 214 have an angle equal to or less than about 50 degrees on either side of the longitudinal axis. Other angles may be used. The rotor bars 213 and 214 may have essentially the same width or have variable widths that are selected in response to the process requirements and to optimize deflaking. Preferably, the rotor bars 213 and 214 have a width from about 0.125 inches (3.175 millimeters) through about 1 inch (25.4 millimeters). The rotor bars 213 and 214 are separated by voids or passages 215 that allow the material to pass through the deflaking rotor-stator interface or zone into the chamber 10 and out the outlet 100. The deflaking rotor outer surface 212 may have a first rotor dam 217 and a second rotor dam 218 or other obstructions placed transversely across the rotor bars 213 and 214 to force material to cross the deflaking rotor-stator interface to be cut, shredded, or otherwise broken down to smaller size.

Figure 3B:
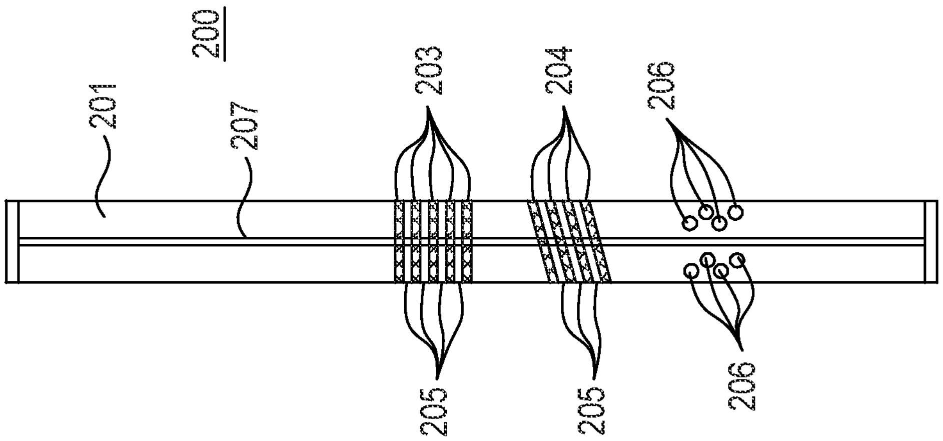
FIG. 3A and FIG. 3B depict axial and radial views, respectively, of various embodiments of a deflaking stator which may be used in the embodiment of the defibering and deflaking pulper of FIG. 1.
Figure 3A:
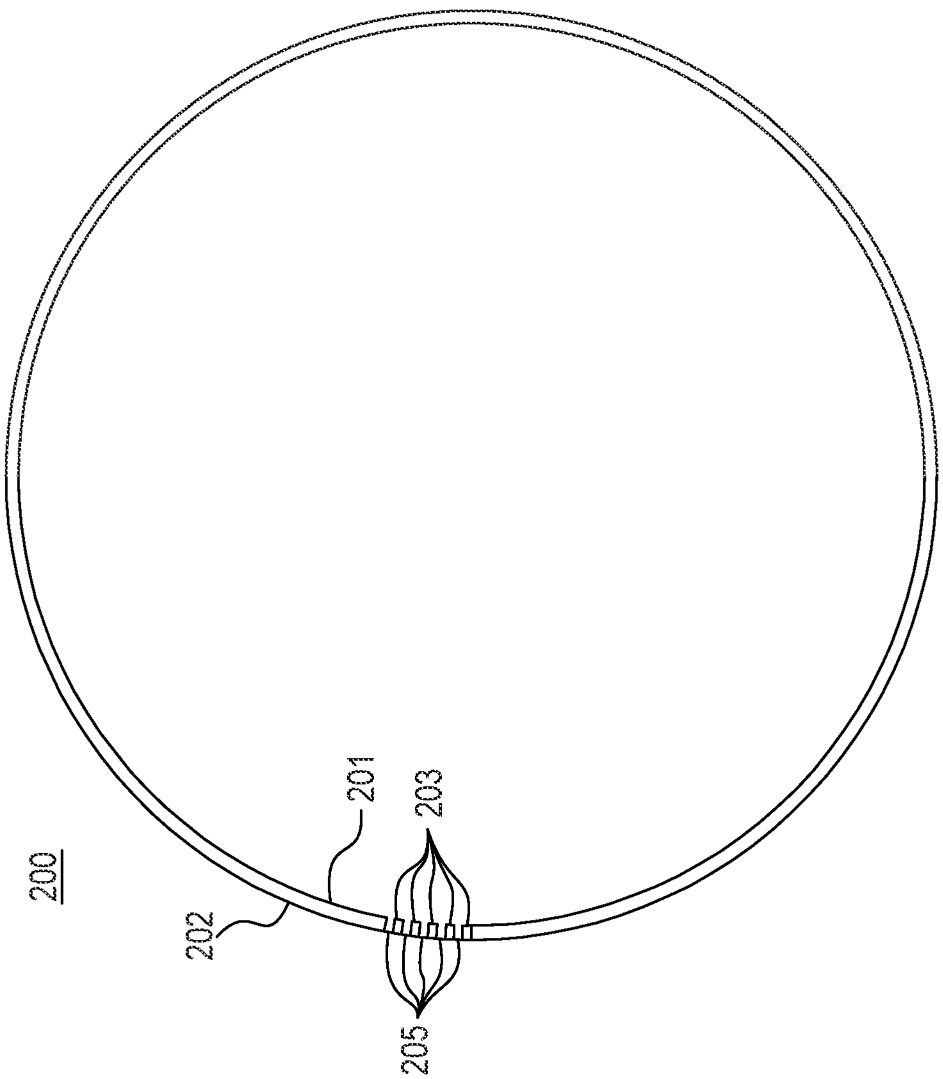

FIG. 3A and FIG. 3B depict axial and radial views, respectively, of the deflaking stator 200 that has a deflaking stator inner surface 201 and a deflaking stator outer surface 202. The radial view in FIG. 3B depicts portions of various embodiments of the deflaking stator inner surface 201 of the deflaking stator 200 that faces the deflaking rotor 210 at the deflaking rotor-stator interface. Similar to the deflaking rotor outer surface 212 described above, the deflaking stator inner surface 201 has multiple projections to deflake the material passing through the deflaking rotor-stator interface. In various embodiments, the multiple projections may include, for example, stator bars 203 and 204, stator holes or openings 206, other shapes, a combination, or the like. The multiple projections may be configured to correspond with the multiple protrusions of the deflaking rotor 210 to optimize the processing throughput of the fiber-based material through the defibering and deflaking pulper 1000. For example, in various embodiments, the multiple projections may be selected to be essentially the same, mirror images, etc., as the multiple protrusions on the deflaking rotor outer surface 212.

In one preferred embodiment, the deflaking stator inner surface 201 has multiple parallel stator bars 203 that are parallel to the main axis of the defibering and deflaking pulper 1000. In another preferred embodiment, the deflaking stator inner surface 201 has multiple angle stator bars 204 that are at an angle to the main axis of the defibering and deflaking pulper 1000. Preferably, the angle stator bars 204 have an angle up to about 50 degrees on either side of the longitudinal axis. Other angles may be used. The stator bars 203 and 204 may have essentially the same width or have variable widths that are selected in response to the process requirements and to optimize deflaking. Preferably, the stator bars 203 and 204 have a width from about 0.125 inches (3.175 millimeters) through about 1 inch (25.4 millimeters). The stator bars 203 and 204 are separated by voids or passages 205 that allow the material to pass through the deflaking rotor-stator interface or zone into the chamber 10 and out the outlet 100. The deflaking stator inner surface 201 may have a stator dam 207 or other obstructions placed transversely across the stator bars 203 and 204 to force material to cross the deflaking rotor-stator interface to be cut, shredded, or otherwise broken down to smaller size.

Figure 4:
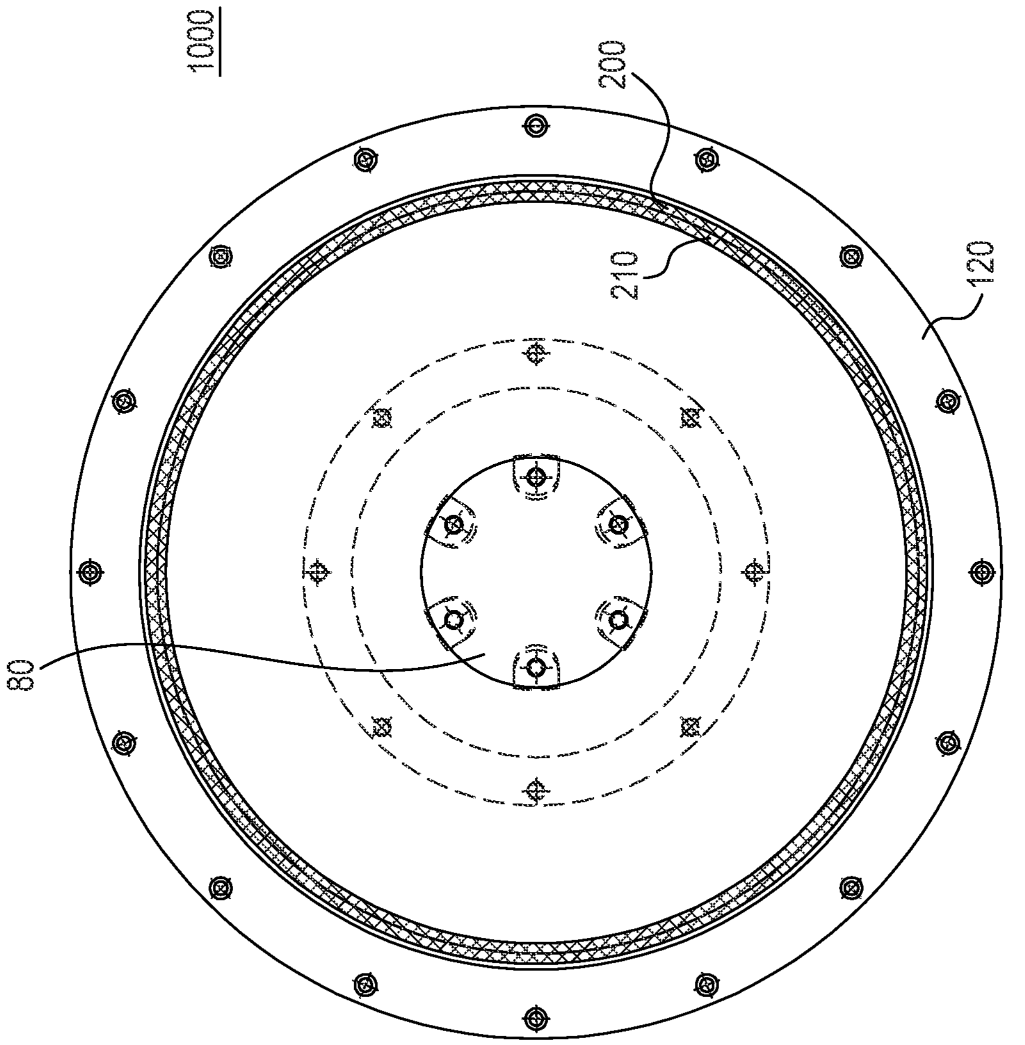
FIG. 4 depicts a sectional axial view of one embodiment of a deflaking rotor-stator interface formed by the deflaking rotor and the deflaking stator in the defibering and deflaking pulper of FIG. 1.

FIG. 4 depicts a sectional axial view of the deflaking rotor-stator interface formed by the deflaking rotor 210 and the deflaking stator 200 in the defibering and deflaking pulper 1000.

During operation of the defibering and deflaking pulper 1000, the fiber-based material is introduced into the tank together with water. The motor causes the shaft 80 to rotate thus spinning the defibering rotor-stator pair and the deflaking rotor-stator pair. The material circulates in the tank, gets an initial wetting, and then is drawn through the defibering rotor-stator interface and then through the deflaking rotor-stator interface along flow lines A-A and B-B in FIG. 1. In the course of moving through the narrow gap between the defibering rotor and the defibering stator, the material is broken down by the tearing/cutting action of the teeth. In the subsequent moving through the narrow gap between the deflaking rotor 210 and deflaking stator 200, the defibered or pulped material is further broken down by the tearing/cutting action of the projections and protrusions. The deflaked material then flows into the chamber 10 and exits via the outlet 100. The deflaked material continues downstream for further processing or may be returned to the vessel.

To process essentially the same throughput of the fiber-based material as a conventional pulper, the defibering and deflaking pulper 1000 has a chamber 10 configured to hold the volume and mass of the deflaked material that is different than the chamber in the conventional pulper that holds defibered material. Likewise, one or more of the shaft 80, the bearings 70 and 90, the hub 60 with a sleeve, and other elements of the defibering and deflaking pulper 1000 are made of materials and configured to handle the torque and other stresses of operating the defibering rotor-stator pair and the deflaking rotor-stator pair than like components in the conventional pulper. The power, speed, and torque of the motor in the defibering and deflaking pulper 1000 is configured differently for operating the defibering rotor-stator pair and the deflaking rotor-stator pair than a motor in a conventional pulper. The teeth of the defibering rotor-stator pair in the defibering and deflaking pulper 1000 may be configured differently than the teeth in a conventional pulper.

To provide a clear and more consistent understanding of the specification and claims of this application, the following definitions are provided.

All numbers expressing quantities used in the specification and claims are to be understood as indicating both the exact values as shown and as being modified by the term "about". Thus, unless indicated to the contrary, the numerical values of the specification and claims are approximations that may vary depending on the desired properties sought to be obtained and the margin of error in determining the values. At the very least, and not as an attempt to limit the application of the doctrine of equivalents to the scope of the claims, each numerical parameter should at least be construed in light of the margin of error, the number of reported significant digits, and by applying ordinary rounding techniques.

Unless the context clearly dictates otherwise, where a range of values is provided, each intervening value to the tenth of the unit of the lower limit between the lower limit and the upper limit of the range is included in the range of values.

The terms “a”, “an”, and “the” used in the specification claims are to be construed to cover both the singular and the plural, unless otherwise indicated or contradicted by context. No language in the specification should be construed as indicating any non-claimed element to be essential to the practice of the invention.

Spatially relative terms, such as “up”, “down”, “top”, “bottom”, “right”, “left”, “beneath”, “below”, “lower”, “above”, “upper”, and the like, may be used for ease of description to describe one element or feature’s relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as “below”, or “beneath” other elements or features would then be oriented “above” the other elements or features. Thus, the exemplary term “below” can encompass both an orientation of above and below. The device may be otherwise oriented (rotated 90 degrees or at other orientations) and the spatially relative descriptors used herein interpreted accordingly.

The simplified diagrams and drawings do not illustrate all the various connections and assemblies of the various components, however, those skilled in the art will understand how to implement such connections and assemblies, based on the illustrated components, figures, and provided descriptions.

While various aspects of the invention are described, it will be apparent to those of ordinary skill in the art that other embodiments and implementations are possible within the scope of the invention. Accordingly, the invention is not to be restricted except in light of the attached claims and their equivalents.

The invention claimed is:

1. A defibering and deflaking pulper for processing a fiber-based material into smaller pieces, comprising:
- a vessel having a wall with an opening;
- a base having a pulper body forming a chamber, the pulper body attached to the wall at the opening;
- a shaft suspended by at least one bearing mounted on the base;
- a defibering rotor-stator pair comprising a defibering stator attached to the pulper body and a defibering rotor axially mounted to the shaft; and
- a deflaking rotor-stator pair having a deflaking stator attached to the pulper body and a deflaking rotor attached to the defibering rotor, the shaft, or both;
- wherein the defibering rotor-stator pair is located within the vessel and the deflaking rotor-stator pair is located within the chamber.

2. The defibering and deflaking pulper of claim 1, wherein:
- the defibering stator in close proximity to a is directly adjacent to the defibering rotor to form a defibering rotor-stator interface, where the defibering stator is a stationary element attached to the wall, and where the defibering rotor is a rotating element mounted on the shaft; and
- the deflaking stator is directly adjacent to the deflaking rotor to form a deflaking rotor-stator interface, where the deflaking stator is an annular stationary deflaking element attached to the pulper body and aligned with the defibering rotor-stator interface, and where the deflaking rotor is an annular rotating deflaking element attached to the defibering rotor.

3. The defibering and deflaking pulper of claim 2, further comprising:
- wherein:
  - the deflaking stator has an internal diameter substantially the same as an internal diameter of the defibering stator at a discharge of the defibering rotor-stator interface; and
  - the deflaking rotor has an outside diameter substantially the same as an outside diameter of the defibering rotor at a discharge of the defibering rotor-stator interface.

4. The defibering and deflaking pulper of claim 1, wherein:
- the deflaking rotor has a deflaking rotor outer surface having multiple protrusions; and
- the deflaking stator has a deflaking stator inner surface having multiple projections.

5. The defibering and deflaking pulper of claim 4, where the multiple protrusions comprise knobs extending radially outward from the deflaking rotor outer surface and the multiple projections comprise knobs extending radially inward from the deflaking stator inner surface.

6. The defibering and deflaking pulper of claim 4, where the multiple projections are substantially the same as the multiple protrusions.

7. The defibering and deflaking pulper of claim 4, where
- the multiple protrusions are rotor bars separated by rotor passages, where the rotor bars have a width from 0.125 inches (3.175 millimeters) to 1 inch (25.4 millimeters), and
- the multiple projections are stator bars separated by stator passages, where the stator bars have a width from 0.125 inches (3.175 millimeters) to 1 inch (25.4 millimeters).

8. The defibering and deflaking pulper of claim 7, where the rotor bars are parallel rotor bars and the stator bars are parallel stator bars.

9. The defibering and deflaking pulper of claim 7, where the rotor bars are angle rotor bars having an angle less than or equal to 50 degrees, wherein the angle is an angle between one of the rotor bars and a line on the deflaking rotor outer surface and parallel to a central axis of rotation of the shaft, and the stator bars are angle stator bars having an angle less than or equal to 50 degrees either side of the central axis, wherein the angle of the stator bars is an angle between one of the stator bars and a line on the deflaking stator inner surface and parallel to the central axis of rotation of the shaft.

10. The defibering and deflaking pulper of claim 7, further comprising:
- at least one rotor dam placed transversely across the rotor bars; and
- at least one stator dam placed transversely across the stator bars.

11. The defibering and deflaking pulper of claim 1, where the deflaking rotor has a deflaking rotor outer surface having multiple protrusions, where the multiple protrusions comprise knobs extending radially outward from the deflaking rotor outer surface.

12. A defibering and deflaking pulper for processing a fiber-based material into smaller pieces, comprising:

a vessel having a wall with an opening;

a base having a pulper body forming a chamber, the pulper body attached to the wall at the opening:

a shaft suspended by at least one bearing mounted on the base;

a defibering stator attached to the pulper body, where the defibering stator is a stationary element;

a defibering rotor axially mounted on the shaft, where the defibering rotor is a rotating element mounted directly adjacent to the defibering stator to form a defibering rotor-stator interface;

a deflaking stator attached to the pulper body and aligned with the defibering rotor-stator interface, where the deflaking stator is an annular stationary deflaking element; and a deflaking rotor is an annular rotating deflaking element attached to the defibering rotor, and where the deflaking rotor is directly adjacent to the deflaking stator to form a deflaking rotor-stator interface;

wherein the defibering rotor and the defibering stator are located within the vessel, and the deflaking rotor and the deflaking stator are located within the chamber.

13. The defibering and deflaking pulper of claim 12, wherein:

the deflaking stator has an internal diameter substantially the same as an internal diameter of the defibering stator at a discharge of the defibering rotor-stator interface; and the deflaking rotor has an outside diameter substantially the same as an outside diameter of the defibering rotor at a discharge of the defibering rotor-stator interface.

14. The defibering and deflaking pulper of claim 12, wherein:

the deflaking rotor has a deflaking rotor outer surface having multiple protrusions; and the deflaking stator has a deflaking stator inner surface having multiple projections.

15. The defibering and deflaking pulper of claim 14, where the multiple projections are substantially the same as the multiple protrusions.

16. The defibering and deflaking pulper of claim 14, where the multiple protrusions are rotor bars separated by rotor passages, where the rotor bars have a width from 0.125 inches (3.175 millimeters) to 1 inch (25.4 millimeters), and the multiple projections are stator bars separated by stator passages, where the stator bars have a width from 0.125 inches (3.175 millimeters) to 1 inch (25.4 millimeters).

17. The defibering and deflaking pulper of claim 16, where the rotor bars are parallel rotor bars and the stator bars are parallel stator bars.

18. The defibering and deflaking pulper of claim 16, where the rotor bars are angle rotor bars having an angle less than or equal to 50 degrees, wherein the angle is an angle between one of the rotor bars and a line on the deflaking rotor outer surface and parallel to a central axis of rotation of the shaft, and the stator bars are angle stator bars having an angle less than or equal to 50 degrees, wherein the angle of the stator bars is an angle between one of the stator bars and a line on the deflaking stator inner surface and parallel to the central axis of rotation of the shaft.

19. The defibering and deflaking pulper of claim 16, further comprising:

at least one rotor dam placed transversely across the rotor bars; and at least one stator dam placed transversely across the stator bars.

20. The defibering and deflaking pulper of claim 14, where the multiple protrusions form rotor holes and the multiple projections form stator holes.

* * * * *